United States Patent [19]
Fukui et al.

[11] Patent Number: 5,429,005
[45] Date of Patent: Jul. 4, 1995

[54] TRANSMISSION SYSTEM FOR TRANSMITTING ENGINE DRIVE IN VARIED SPEEDS TO DRIVE WHEELS OF A WORKING VEHICLE

[75] Inventors: Tetsu Fukui; Takeshi Ura; Shigekazu Hasegawa, all of Sakai, Japan

[73] Assignee: Kubota Corporation, Japan

[21] Appl. No.: 162,435

[22] Filed: Dec. 3, 1993

[30] Foreign Application Priority Data

Jan. 20, 1993 [JP] Japan .................. 5-007145

[51] Int. Cl.⁶ ............................................. F16H 3/08
[52] U.S. Cl. ............................... 74/325; 74/339; 74/340; 74/335
[58] Field of Search ............... 74/325, 330, 339, 340, 74/335, 15.63

[56] References Cited

U.S. PATENT DOCUMENTS

| | | | |
|---|---|---|---|
| 4,485,687 | 12/1984 | Burke et al. | 74/330 |
| 4,519,484 | 5/1985 | Nagaoka et al. | 74/330 |
| 4,637,269 | 1/1987 | Hasegawa et al. | 74/339 |
| 4,881,417 | 11/1989 | Yoshii et al. | |
| 5,024,306 | 6/1991 | Fukui et al. | |
| 5,109,964 | 5/1992 | Fukui et al. | |

FOREIGN PATENT DOCUMENTS

| | | |
|---|---|---|
| 439464 | 2/1992 | Japan . |
| 1109357 | 4/1968 | United Kingdom . |
| 1288961 | 9/1972 | United Kingdom . |

*Primary Examiner*—Charles A. Marmor
*Assistant Examiner*—Peter Kwon
*Attorney, Agent, or Firm*—Webb Ziesenheim Bruening Logsdon Orkin & Hanson

[57] ABSTRACT

A transmission system having a first clutch for receiving engine drive, a second clutch disposed downstream of the first clutch with respect to a direction of drive transmission, change speed gearing disused between the first clutch and second clutch, a first transmission shaft for transmitting drive from the first clutch to the change speed gearing, a second transmission shaft for transmitting drive in varied speeds from the change speed gearing to the second clutch, a third transmission shaft for transmitting drive from the second clutch to drive wheels, and a third clutch for transmitting drive at a low speed to the first transmission shaft. The first clutch and second clutch are disengageable upon start of a shifting operation of the change speed gearing, and re-engageable upon completion of the shifting operation. To obtain matching between rotating rates of an input line and an output line of the change speed gearing, the third clutch transmits the low speed drive to the first transmission shaft upon disengagement of the first clutch and second clutch, and breaks the drive upon completion of the shifting operation of the change speed gearing.

12 Claims, 6 Drawing Sheets

TRANSMISSION SYSTEM FOR TRANSMITTING ENGINE DRIVE IN VARIED SPEEDS TO DRIVE WHEELS OF A WORKING VEHICLE

BACKGROUND OF THE INVENTION

1. Field of the Invention

The present invention relates to a propelling drive transmission system of a working vehicle having change speed gearing, and more particularly to a propelling drive transmission system operable in response to a change speed command to disengage a change speed clutch, shift the change speed gearing, and engage the change speed clutch again after the shifting operation.

2. Description of the Related Art

In the above transmission system for a working vehicle, for example, the change speed clutch is disposed downstream, with respect to a direction of drive transmission, of the change speed gearing which is shiftable by a hydraulic actuator. In response to a change speed command, the change speed clutch is automatically disengaged to disconnect the drive wheels from the change speed gearing. Thereafter the change speed gearing is operated by the actuator. Upon completion of the shifting operation, the change speed clutch is automatically engaged to enable drive transmission again.

To shift the above change speed gearing, a shift gear engaging one transmission gear must be caused to slide away from that gear and engage a desired transmission gear. At this time, the shift gear and desired transmission gear are brought into the same rotating rate before the shift gear engages the desired transmission gear. A typical example of change speed gearing achieving this is known as the synchromesh type. The transmission system including such change speed gearing has the following disadvantage.

When the change speed clutch is disengaged in response to a change speed command, a transmission shaft of the change speed gearing operatively connected to the change speed clutch, i.e. an output shaft of the change speed gearing, is placed in freely rotating state. However, a transmission shaft of the change speed gearing operatively connected to the engine, i.e. an input shaft of the change speed gearing, remains to be driven at a high rotating rate by the engine drive. At this time, a substantial difference exists in rotating rate between the input shaft and output shaft.

Thus, when the change speed gearing is shifted by the actuator, a considerable time is consumed before the output shaft is brought to the same rotating rate as the input shaft. This is one of the factors hampering high-speed operation of this transmission system.

As an improvement in the above situation, a transmission system is known from Japanese Patent Publication Kokai No. 4-39464, which includes a first change speed clutch, change speed gearing and a second change speed clutch arranged in the stated order downstream of an engine.

According to this system, as an actuator starts shifting the change speed gearing in response to a change speed command, the first and second clutches are disengaged. The first and second clutches are engaged again in response to completion of the shifting operation by the actuator. With this construction, the first clutch upstream of the change speed gearing is disengaged as well as the second, downstream clutch. Thus, when a shifting operation is effected, a transmission shaft of the change speed gearing operatively connected to drive wheels, i.e. an output shaft of the change speed gearing, and a transmission shaft of the change speed gearing operatively connected to the engine, i.e. an input shaft of the change speed gearing, are both placed in freely rotating state. Consequently, a reduction is expected in the time taken for the input shaft and output shaft to attain the same rotating rate when a shifting operation is effected, compared with the first-mentioned transmission system.

However, in this transmission system also, immediately after disengagement of the first and second clutches, the input shaft remains rotating at a high rate corresponding to the drive of the engine whereas the output shaft rotates at a lower rate corresponding to a running speed of the vehicle.

Thus, despite disengagement of the first and second clutches, a significant difference still exists in rotating rate between the input shaft and output shaft of the change speed gearing. Even though these shafts are in freely rotating state, a little time is consumed before the shafts are brought to the same rotating rate. A further improvement is required to realize a smooth and quick shifting operation.

SUMMARY OF THE INVENTION

The object of the invention is to provide a further improvement in the transmission system having clutches arranged upstream and downstream of change speed gearing with respect to a direction of drive transmission, to realize a system capable of smooth and quick shifting operations.

The above object is fulfilled, according to the present invention, by a transmission system comprising a first clutch, a second clutch disposed downstream of the first clutch with respect to a direction of drive transmission, and a drive control device for transmitting drive at a low speed substantially corresponding to a rotating rate of an output line of change speed gearing to an input line of the change speed gearing upon disengagement of the first clutch and the second clutch, and breaking the drive upon completion of a shifting operation of the change speed gearing.

According to this construction, when a shifting operation is effected, the input line of the change speed gearing freely rotating at a high speed corresponding to engine drive is reduced to a speed substantially corresponding to the output line of the change speed gearing by action of the drive control device taken immediately following disengagement of the first and second clutches. Consequently, good matching is established between input line and output line of the change speed gearing to enable a smooth and quick change gear operation.

In a preferred embodiment of the invention, the drive control device is formed as a third clutch for controlling transmission of drive from a drive transmitting line between the change speed gearing and drive wheels to the input line of the change speed gearing. This construction secures matching in rotating rate between the input line or input gear of the change speed gearing and the output line or output gear thereof in time of a shifting operation. This feature will be described in greater detail below.

Upon start of a shifting operation of the change speed gearing, the first clutch upstream of the change speed gearing and the second clutch downstream thereof are disengaged, and the third clutch is engaged. When the first and second clutches are disengaged, the input line (input shaft and input gear) and the output line (output shaft and output gear) of the change speed gearing are placed in freely rotating state. In the absence of action of the third clutch, the input line would, generally, freely rotate at a high speed corresponding to the engine drive, whereas the output line would rotate at a low speed corresponding to a running speed of the vehicle. A large difference would exist in rotating rate between input line and output line of the change speed gearing. However, with the third clutch engaged, the drive transmitted to the drive wheels is transmitted to the input line of the change speed gearing. Since the drive transmitted from the change speed gearing to the drive wheels is rotated at the low speed corresponding to the running speed of the vehicle, the input line (input shaft and input gear) of the change speed gearing is forcibly reduced to the low speed corresponding to the running speed. Consequently, good matching is secured between the rotating rates of the input line and output line of the change speed gearing, to enable a smooth and quick shifting operation of the change speed gearing. Upon completion of the shifting operation, the first and second clutches are re-engaged, and the third clutch is disengaged.

As described above, drive transmission is broken in both upstream and downstream positions of the change speed gearing when a shifting operation is effected. Then, low speed drive is transmitted to the input line of the change speed gearing to secure matching between rotating rates of the input line and output line of the change speed gearing. Consequently, the shifting operation of the change speed gearing is carried out efficiently.

Other features and advantages of the present invention will be apparent from the following description of preferred embodiments to be taken with reference to the drawings.

DETAILED DESCRIPTION OF THE PREFERRED EMBODIMENTS

Figure 1:
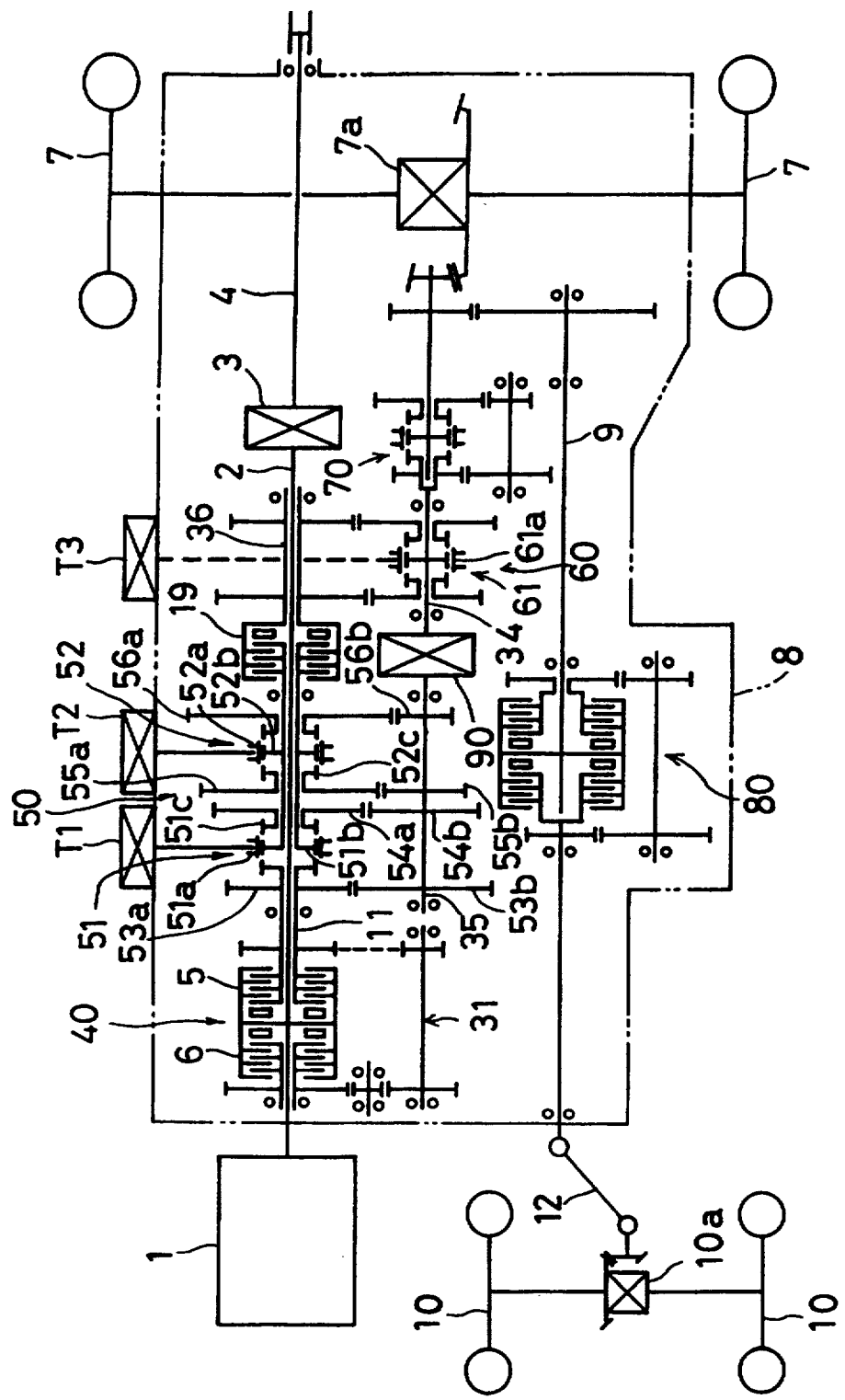
FIG. 1 is a schematic view of a transmission system according to the present invention.

FIG. 1 schematically shows the interior of a transmission case 8 of a four-wheel drive tractor which is one example of working vehicles. A PTO system for transmitting drive of an engine 1 to an external working implement includes a transmission shaft 2 for receiving the drive from the engine 1, a PTO clutch 3 for controlling the drive transmission, and a PTO shaft 4 connected to the PTO clutch 3 and having a coupling at a free end thereof for connection to the working implement. A propelling system for transmitting engine drive to drive wheels includes a backward/forward changeover device 40 acting also as a first clutch (main clutch), a main change speed device 50, a first auxiliary change speed device 60, a second auxiliary change speed device 70 and a rear differential 7a. In this embodiment, while of course the rear differential 7a drives rear wheels 7, power is branched off immediately upstream of the rear differential 7a to drive front wheels 10 through a transmission shaft 9, a hydraulic clutch type front wheel change speed device 80, a front wheel transmission shaft 12 and a front differential 10a.

The backward/forward changeover device 40 includes two hydraulically operable frictional multidisk clutches. One of these clutches is a backward drive clutch 6 which, when engaged, connects the transmission shaft 2 acting as an engine output shaft to a tubular shaft 11 through a transmission line 31 including a reversing gear to propel the tractor backward. The other clutch is a forward drive clutch 5 which, when engaged, connects the transmission shaft 2 directly to the tubular shaft 11 to propel the tractor forward. When both of the forward drive clutch 5 and backward drive clutch 6 are disengaged, drive transmission from the transmission shaft 2 to the tubular shaft 11 is broken. Consequently, the two clutches 5 and 6 may act as a main clutch of the propelling system. This main clutch is hereinafter referred to as a first clutch.

The main change speed device 50 includes two synchromesh change speed mechanisms 51 and 52, a transmission shaft 35 acting, in combination with the tubular shaft 11, as an input line of the device 50, a tubular shaft 36 acting as an output line thereof, and four gear sets 53a, 53b, 54a, 54b, 55a, 55b, 56a 56b. The gear set 53a, 53b transmits drive from the tubular shaft 11 to the transmission shaft 35. The gear sets 54a, 54b, 55a, 55b, 56a 56b transmit drive from the transmission shaft 35 to the tubular shaft 36 in varied speeds. The synchromesh change speed mechanisms 51 and 52 are known per se, and each includes a sleeve 51a, a clutch hub 51b and a pair of right and left clutch gears 51c. The main change speed device 50 provides four speeds, including a direct connection of the tubular shaft 11 and tubular shaft 36. Drive from the main change speed device 50 is supplied to the second clutch 19.

The first auxiliary change speed device 60 transmits drive from the second clutch 19 to a transmission shaft 34 in varied speeds. This change speed device 60 includes a similar synchromesh change speed mechanism 61 and two gear sets to provide two speeds. The second auxiliary change speed device 70 is additionally provided downstream of the first auxiliary change speed device 60.

FIG. 1 schematically shows also hydraulic cylinders T1, T2 and T3 acting as actuators for sliding two sleeves 51a and 52a of the main change speed device 50 and a sleeve 61 a of the first auxiliary change speed device 60.

A control system for the hydraulic cylinders T1, T2 and T3 disengages the first clutch (forward drive clutch 5 and backward drive clutch 6) and the second clutch 19 upon start of a shifting operation by the hydraulic cylinders T1, T2 and T3, and engages the first clutch and second clutch 19 upon completion of the shifting operation. The second auxiliary change speed device 70 has a sleeve slidable directly by a shift lever (not shown) to effect a shifting operation.

The transmission system according to the present invention, as shown in FIG. 1, also has a transmission mechanism 90 including a third clutch. The third clutch connects the transmission shaft 34 of the first auxiliary change speed device 60 disposed downstream of the second clutch 19 to the transmission shaft 35 of the main change speed device 50 when the first clutch (forward drive clutch 5 and backward drive clutch 6) and the second clutch 19 are disengaged upon start of a shifting operation of the main change speed device 50 by the hydraulic cylinders T1 and T2.

The transmission mechanism or third clutch 90 will be described in detail below.

Figure 2:
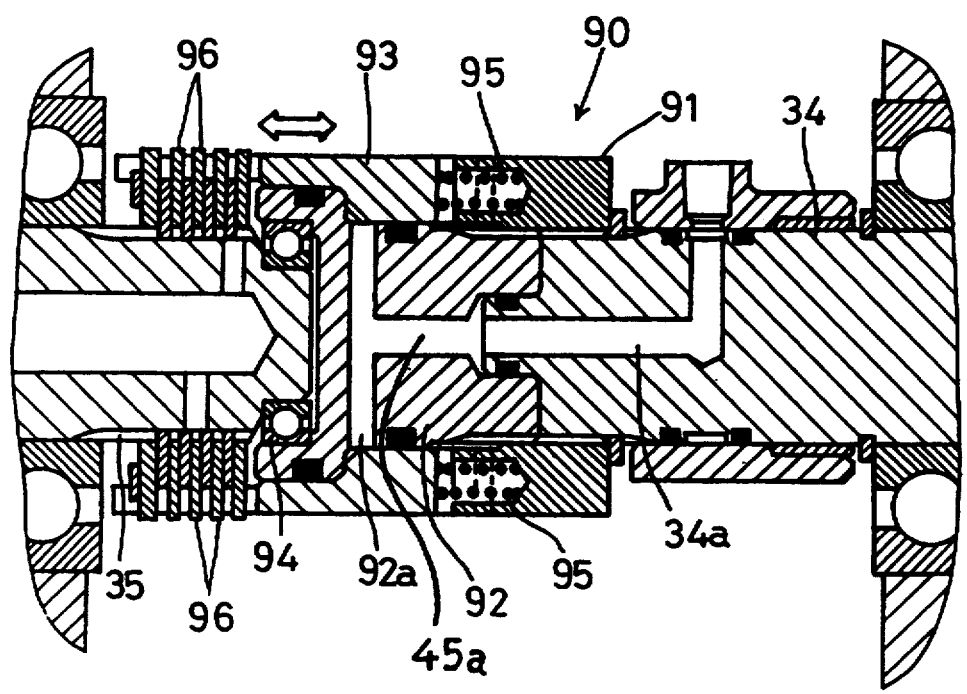
FIG. 2 is a sectional side view of a third clutch.

As shown in FIG. 2, the transmission shaft 35 acting as the input line of the main change speed device 50 and the transmission shaft 34 of the first auxiliary change speed device 60 are arranged coaxially. A support member 92 is attached to an end of the transmission shaft 34 of the first auxiliary change speed device 60. A bearing 94 is mounted between the support member 92 and the transmission shaft 35 of the main change speed device 50. An annular receiving member 91 is fixedly mounted to bridge outer surfaces of the transmission shaft 34 and support member 92 through splines.

An annular clutch case 93 is axially slidably mounted on the outer surface of the support member 92 and opposed to the receiving member 91. The clutch case 93 has a righthand end in FIG. 2 engaged with a lefthand end of the receiving member 91 through large jag structures formed on these opposed ends. Springs 95 are mounted between the opposed ends to bias the clutch case 93 leftward in FIG. 2. Thus, the transmission shaft 34, support member 92, receiving member 91 and clutch case 93 are rotatable together. The other end of the clutch case 93 extends over an end of the transmission shaft 35 of the main change speed device 50. Friction disks 96 are mounted in an annular space formed between the extended end of the clutch case 93 and the transmission shaft 35 to act as the third clutch. The transmission shaft 34 of the first auxiliary change speed device 60 and the support member 92 define oil passages 34a and 92a. Pressure oil is supplied between the support member 92 and clutch case 93 through these oil passages 45a and 92a to move the clutch case 93 axially (rightward in FIG. 2), thereby pressing the friction disks 96 upon an end of the support member 92. When the friction disks 96 are engaged, the transmission shafts 34 and 35 are connected through the receiving member 91 and clutch case 93. As a result, drive is transmitted from the transmission shaft 34 of the first auxiliary change speed device 60 to the transmission shaft 35 acting as the input line of the main change speed device 50. This state of the transmission mechanism 90 occurs during a shifting operation of the main change speed device 50.

When the pressure oil is removed from between the support member 92 and clutch case 93, the clutch case 93 returns leftward to the position shown in FIG. 2 under the force of springs 95. This separates the transmission shaft 34 of the first auxiliary change speed device 60 and the transmission shaft 35 of the main change speed device 50. The transmission mechanism 90 is in this state during an ordinary run of the tractor.

A hydraulic control system for controlling the hydraulic cylinders T1, T2 and T3, first clutch (forward drive clutch 5 and backward drive clutch 6), second clutch 19 and transmission mechanism 90 will be described next.

Figure 3:
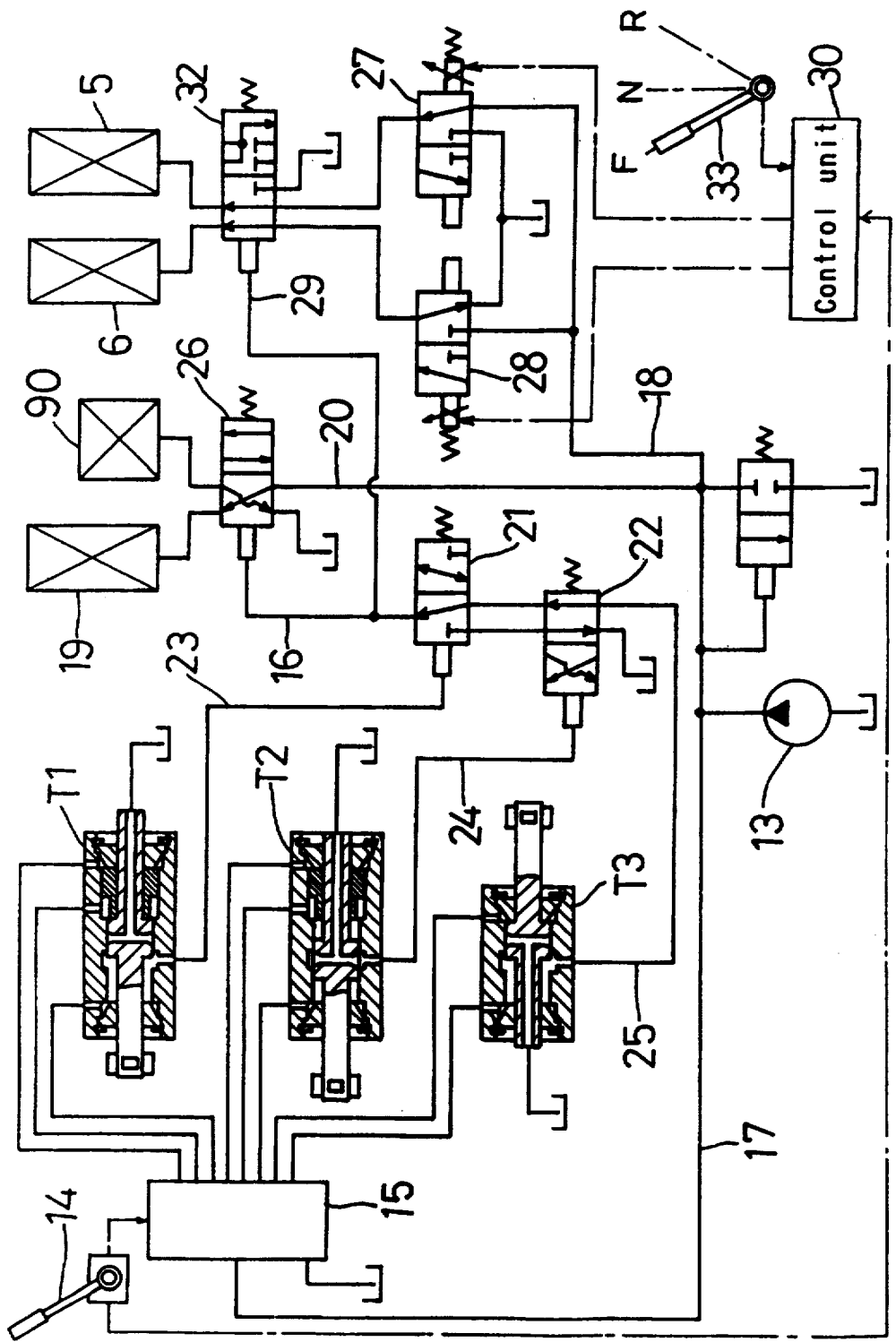
FIG. 3 is a circuit diagram including hydraulic cylinders and clutches.

As shown in FIG. 3, pressure oil is supplied from an oil pump 13 to the hydraulic cylinders T1, T2 and T3 through a rotary valve 15. The system includes a pair of pilot oil lines 16 and 29 having pilot pressures variable when the hydraulic cylinders T1, T2 and T3 are operated. The rotary valve 15 receives pressure oil from the oil pump 13 through an oil line 17. Further, pressure oil is supplied to the forward drive clutch 5 and backward drive clutch 6 through an oil line 18, a forward drive clutch control valve 27 and a backward drive clutch control valve 28, which are electromagnetic proportional pressure control valves, and through a first changeover valve 32.

Pressure oil is supplied also to the second clutch 19 and transmission mechanism 90 through an oil line 20 branched from the oil line 18 and through a second changeover valve 26. The pilot oil lines 29 and 16 are connected to the first and second changeover valves 32 and 26, respectively. The pilot pressures of the pilot oil lines 16 and 29 are controllable by control valves 21 and 22. Pilot oil lines 23 and 24 extending from the hydraulic cylinders T1 and T2 for operating the main change speed device 50 and a pilot oil line 25 extending from the hydraulic cylinder T3 for operating the first auxiliary change speed device 60 are connected to the control valves 21 and 22.

A shift lever 14 is mechanically interlocked to the rotary valve 15 to operate the rotary valve 15 to a neutral position and a first to an eighth speed positions. Control positions of the shift lever 14 are electrically inputted to a control unit 30. A backward/forward changeover lever 33 is provided, whose control positions are also electrically inputted to the control unit 30.

Operations of the above components during shifting operations will be described next.

FIG. 3 shows a state in which the backward/forward changeover lever 33 is operated to a forward drive position F, and the shift lever 14 is operated to a first speed position. The hydraulic cylinder T1 for the main change speed device 50 is in a first speed position, with the hydraulic cylinder T2 lying in a neutral position and the hydraulic cylinder T3 for the first auxiliary change speed device 60 in a low speed position. Consequently, the control valve 21 is switched by the pilot pressure from the hydraulic cylinder T1, whereby the pilot pressure from the hydraulic cylinder T3 is supplied through the control valves 21 and 22 to the pilot oil lines 16 and 29. Thus, the first and second changeover valves 32 and 26 are placed in the communicating positions shown in FIG. 3. That is, pressure oil is supplied from the oil line 18 to the forward drive clutch 5 through the forward drive clutch control valve 27 and first changeover valve 32, to engage the forward drive clutch 5. On the other hand, the backward drive clutch 6 is disengaged by the backward drive clutch control valve 28. Pressure oil is supplied from the oil line 20 to the second clutch 19 through the second changeover valve 26, to engage the second clutch 19. The transmission mechanism 90 is disengaged by the second changeover valve 26. In this state, the tractor runs at a first forward speed.

What takes place when, in the first forward speed state shown in FIG. 3, an operation is started to move the shift lever 14 from the first speed position to a second speed position will be described next.

In this case, the hydraulic cylinder T starts moving from the first speed position to a second speed position by the action of pressure oil from the rotary valve 15. Then, the pilot pressure in the pilot oil line 23 falls to switch the control valve 21, thereby placing the pilot oil lines 16 and 29 in a drain condition. As a result, the first and second changeover valves 32 and 26 are switched to disengage the forward drive clutch 5 and second clutch 19 quickly (point of time A1 in FIG. 4). The forward drive clutch control valve 27 is also switched to a drain position.

Figure 4:
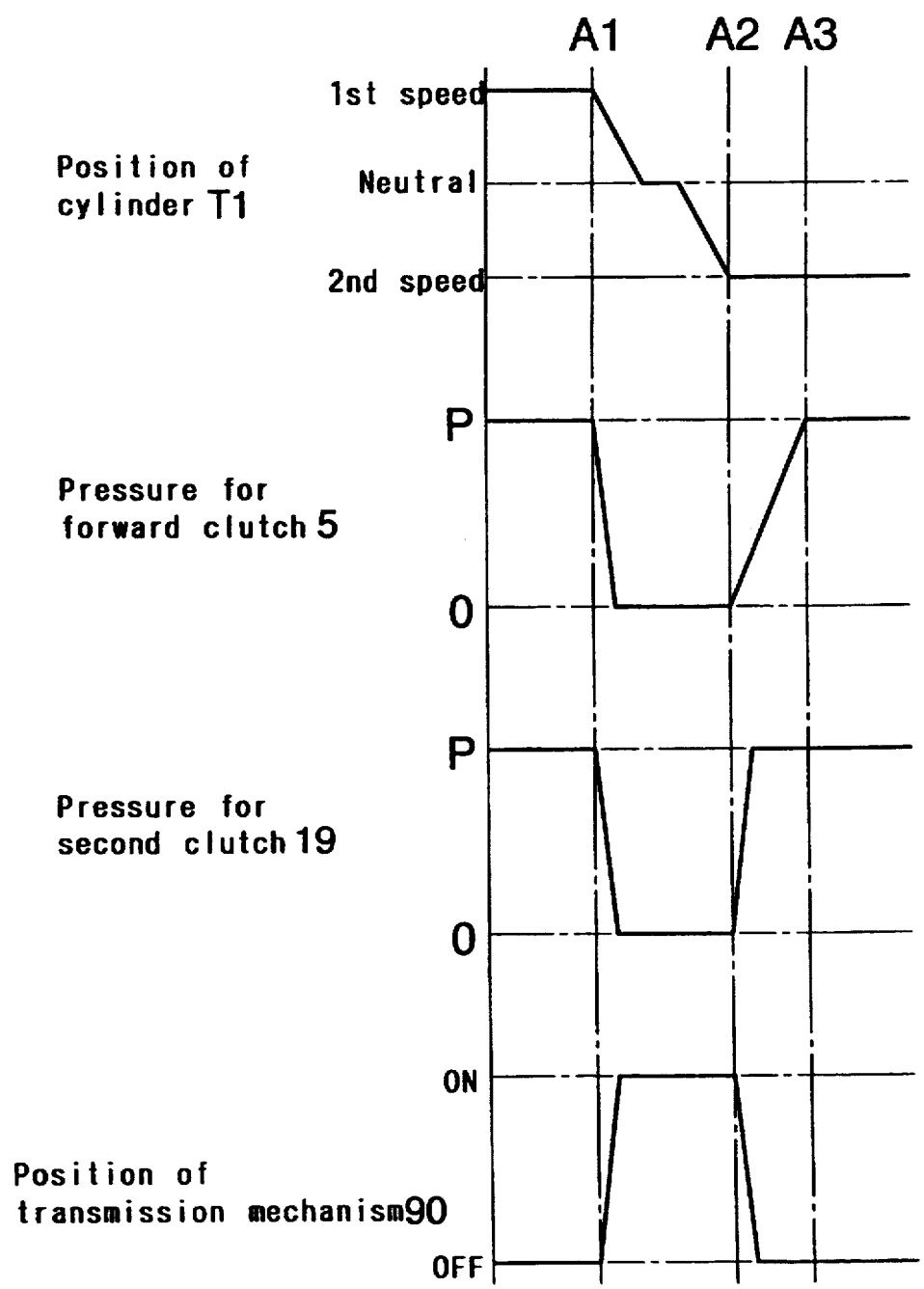
FIG. 4 is a time chart showing operation of a hydraulic cylinder and the clutches when a shift is made from a first forward speed to a second forward speed.

At the same time, pressure oil is supplied from the oil line 20 to the transmission mechanism 90 through the second changeover valve 26, whereby the transmission mechanism 90 is quickly engaged (point of time A1 in FIG. 4).

When, as described above, the forward drive clutch 5 and second clutch 19 shown in FIG. 1 are disengaged, that is when the first clutch and second clutch 19 are both disengaged, the transmission shaft 35 acting as the input line of the main change speed device 50, i.e. operatively connected to the engine, and the transmission shaft 36 operatively connected to the rear wheels 7 are placed in freely rotating state.

Immediately after disengagement of the forward drive clutch 5 and second clutch 19, the transmission shaft 35 operatively connected to the engine 1 remains freely rotating at a high speed corresponding to the drive of the engine 1, whereas the transmission shaft 36 operatively connected to the rear wheels 7 is freely rotating at a low speed corresponding to a running speed of the tractor. A large difference should occur in rotating rate between the two transmission shafts 35 and 36. However, by engaging the friction clutch of the transmission mechanism 90 as described above, the transmission shaft 34 of the first auxiliary change speed device 60 is connected to the transmission shaft 35 acting as the input line of the main change speed device 50. This produces the following effect. Since the transmission shaft 34 of the first auxiliary change speed device 60 is rotating at the low speed corresponding to the running speed of the tractor, the transmission shaft 35 of the main change speed device 50 is forcibly decelerated to the low speed corresponding to the running speed. As a result, the rotating rate of the transmission shaft 35 of the main change speed device 50 quickly approaches that of the transmission shaft 36 operatively connected to the rear wheels 7. The rotating rates of the two transmission shafts 35 and 36 will become substantially the same. Thus, a shifting operation to the second speed of the synchromesh change speed mechanisms 51 and 52 is carded out smoothly and quickly.

The above shifting operation by the hydraulic cylinder T1 takes place between point of time A1 and point of time A2 in FIG. 4. After this operation is completed, the hydraulic cylinder T1 supplies a pilot pressure to the pilot oil line 23 to switch the control valve 21 to the position shown in FIG. 3. As a result, the pilot pressures are supplied through the pilot oil lines 16 and 29 again, to switch the first and second changeover valves 32 and 26 to the positions shown in FIG. 3. The second clutch 19 is then engaged quickly and the transmission mechanism 90 disengaged quickly.

The forward drive clutch control valve 27, which has been in the drain position, is now operated to an oil supplying position, whereby the pressure for the forward drive clutch 5 smoothly increases from the point of time A2. At a point of time A3, a pressure P is attained for fully engaging the forward drive clutch 5.

The above condition is provided between first forward speed and second forward speed and between fifth forward speed and sixth forward speed. Between third forward speed and fourth forward speed and between seventh forward speed and eighth forward speed, the hydraulic cylinder T2 in FIG. 3 operates to switch the control valve 22 to produce a similar automatic control. Between fourth forward speed and fifth forward speed, the hydraulic cylinders T1, T2 and T3 operate to produce a similar automatic control. When the backward/forward changeover lever 33 is operated to a reverse position R to supply pressure oil to the backward drive clutch 6, the above automatic controls take place from a first backward speed to an eighth backward speed.

OTHER EMBODIMENTS

Figure 5:
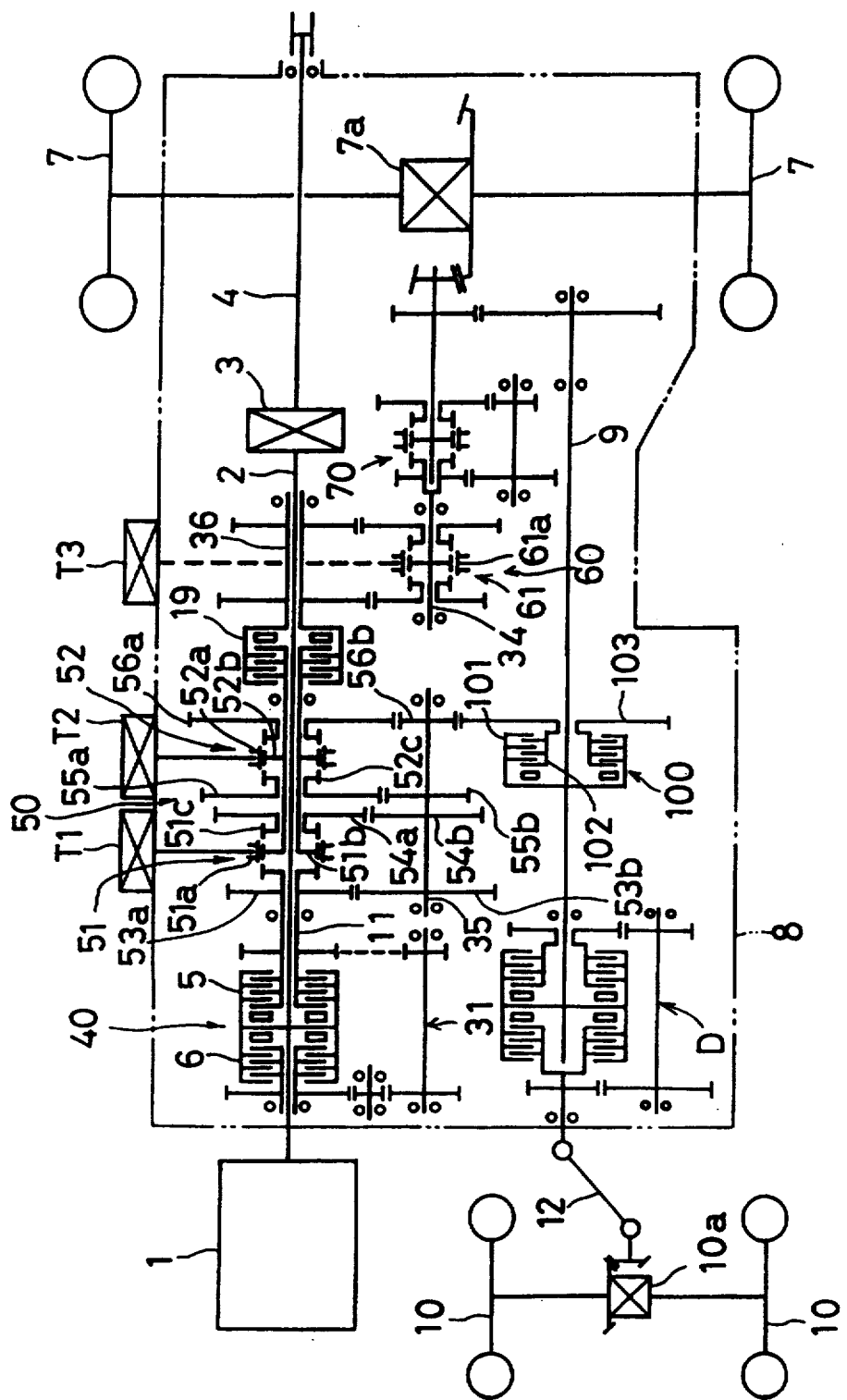
FIG. 5 is a schematic view of a transmission system in another embodiment of the invention.

The transmission system shown in FIG. 5 differs from the preceding embodiment in that the transmission shaft 35 acting as the input line of the main change speed device 50 receives drive from the drive wheels through the front wheel drive shaft 9, instead of the transmission shaft 34 of the first auxiliary change speed device 60. For this purpose, the transmission mechanism 90 in the preceding embodiment is replaced by a hydraulically operable friction clutch 100 to act as a transmission mechanism. This clutch includes clutch disks 101 connected to the front wheel drive shaft 9, and clutch disks 102 having a gear 103. The gear 103 is meshed with a change speed gear 56b mounted on the transmission shaft 35. When the transmission mechanism or hydraulically operable friction clutch 100 is engaged, drive is transmitted from the front wheel drive shaft 9 to the transmission shaft 34 of the first auxiliary change speed device 60. As a result, the rotating rates of the transmission shafts 35 and 36, which are the input and output shafts of the main change speed device 50, become substantially the same. Thus, a shifting operation of the synchromesh change speed mechanisms 51 and 52 is carried out quickly.

In FIG. 5 showing the different embodiment, like reference numerals are used to identify like parts in FIG. 1 which will not be described again.

Figure 6:
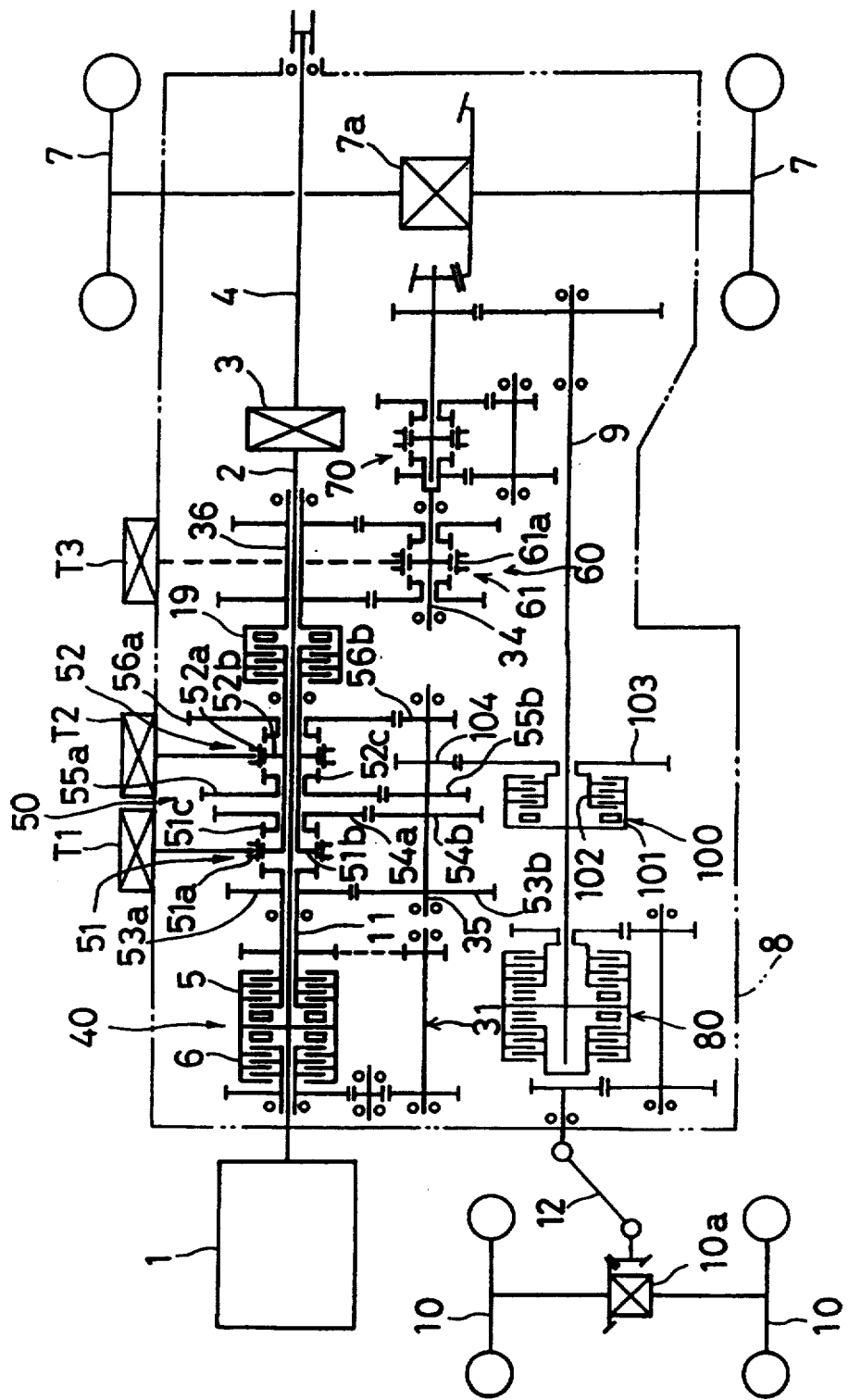
FIG. 6 is a schematic view of a transmission system in a further embodiment of the invention.

The transmission system shown in FIG. 6 is substantially the same as the transmission system in FIG. 5, the only difference lying in that the gear 103 of the transmission mechanism 100 is meshed with a gear 104 mounted on the transmission shaft 35 independently of the change speed gear of the main change speed device 50.

In the three embodiments described above, the second clutch 19 is the ordinary type in which friction disks are pressed by a piston. This clutch may comprise the type engageable and disengageable instantaneously, such as a tapered roller clutch or a claw clutch.

Instead of using the forward drive clutch 5 and backward drive clutch 6 of the backward/forward changeover device as the main clutch of the propelling transmission system, one hydraulically operable multidisk clutch may be provided in the same position to act as the first clutch, with a backward/forward changeover device provided in a different position.

What is claimed is:

1. A transmission system for transmitting engine drive to drive wheels in varied speeds, comprising:
   a first clutch for receiving the engine drive;
   a second clutch disposed downstream of said first clutch with respect to a direction of drive transmission;
   change speed gearing disposed between said first clutch and said second clutch;
   said first clutch and said second clutch being disengageable upon start of a shifting operation of said change speed gearing, and re-engageable upon completion of the shifting operation;
   first drive transmitting means for transmitting drive from said first clutch to said change speed gearing;

second drive transmitting means for transmitting drive in varied speeds from said change speed gearing to said second clutch;

third drive transmitting means for transmitting drive from said second clutch to said drive wheels; and drive control means for transmitting drive at a low speed substantially corresponding to a rotating rate of said second drive transmitting means to said first drive transmitting means, said drive control means being operable to transmit said drive at a low speed to said first drive transmitting means upon disengagement of said first clutch and said second clutch, and break said drive upon completion of the shifting operation of said change speed gearing.

2. A transmission system as defined in claim 1, wherein said drive control means includes a third clutch for controlling transmission of drive from said third drive transmitting means to said first drive transmitting means.

3. A transmission system as defined in claim 2, wherein said first clutch, said second clutch, said change speed gearing and said third clutch are hydraulically operable.

4. A transmission system as defined in claim 3, wherein said change speed gearing is a synchromesh type gearing.

5. A transmission system as defined in claim 3, wherein said first clutch, said second clutch and said third clutch are multidisk frictional clutches.

6. A transmission system as defined in claim 2, wherein said first drive transmitting means includes a change speed input shaft operatively connected at one end thereof to an output of said first clutch and at the other end to an input gear train of said drive control means.

7. A transmission system as defined in claim 6, wherein said third drive transmitting means is formed as a rear wheel drive system for transmitting drive from said second clutch to rear wheels.

8. A transmission system as defined in claim 7, wherein said drive control means includes a transmission shaft operatively connected to said rear wheel drive system, and a transmission shaft operatively connected to said change speed input shaft, said third clutch being disposed between said transmission shafts.

9. A transmission system as defined in claim 6, wherein said third drive transmitting means is formed as a front wheel drive system for transmitting drive from said second clutch to front wheels.

10. A transmission system as defined in claim 9, wherein said third clutch is operatively connected at one end thereof to said front wheel drive system and at the other end to said change speed input shaft.

11. A transmission system as defined in claim 1, wherein said first clutch is incorporated into backward/forward drive changeover means, said first clutch including a forward drive clutch portion and a backward drive clutch portion.

12. A transmission system as defined in claim 1, wherein said second clutch is formed as a quick operating clutch such as a tapered roller clutch or a claw clutch.

* * * * *